(12) United States Patent
Song

(10) Patent No.: US 12,045,613 B2
(45) Date of Patent: Jul. 23, 2024

(54) VECTOR DATA PROCESSING METHOD AND SYSTEM, COMPUTING NODE, AND STORAGE MEDIUM

(71) Applicant: ZHEJIANG UNIVIEW TECHNOLOGIES CO., LTD., Zhejiang (CN)

(72) Inventor: Binghui Song, Zhejiang (CN)

(73) Assignee: ZHEJIANG UNIVIEW TECHNOLOGIES CO., LTD., Zhejiang (CN)

( * ) Notice: Subject to any disclaimer, the term of this patent is extended or adjusted under 35 U.S.C. 154(b) by 0 days.

(21) Appl. No.: 18/041,440

(22) PCT Filed: Dec. 31, 2020

(86) PCT No.: PCT/CN2020/142391
§ 371 (c)(1),
(2) Date: Feb. 13, 2023

(87) PCT Pub. No.: WO2022/036995
PCT Pub. Date: Feb. 24, 2022

(65) Prior Publication Data
US 2023/0297374 A1 Sep. 21, 2023

(30) Foreign Application Priority Data
Aug. 17, 2020 (CN) .......................... 202010826189.5

(51) Int. Cl.
*G06F 9/30* (2018.01)
(52) U.S. Cl.
CPC ........ *G06F 9/30036* (2013.01); *G06F 9/3001* (2013.01)
(58) Field of Classification Search
CPC ........................... G06F 9/30036; G06F 9/3001
See application file for complete search history.

(56) References Cited

U.S. PATENT DOCUMENTS

2018/0204111 A1* 7/2018 Zadeh ................. G06V 10/764
2018/0238951 A1   8/2018 Tao et al.
(Continued)

FOREIGN PATENT DOCUMENTS

CN     106156809 A     11/2016
CN     106597439 A      4/2017
(Continued)

OTHER PUBLICATIONS

International Search Report in Application No. PCT/CN2020/142391 dated May 14, 2021, 6 pages, including translation.

*Primary Examiner* — Zachary K Huson
(74) *Attorney, Agent, or Firm* — Morgan, Lewis & Bockius LLP

(57) ABSTRACT

A vector data processing method includes that each computing node receives newly added vector data and places the data in a cache; when detecting that an amount of the data in the cache of one computing node meets a preset amount, the one computing node sends the amount to a master node; the master node acquires an amount of all computing nodes, and in the case where the average amount reaches a preset average amount, the master node instructs each computing node to extract a training sample; each computing node extracts a training sample from and sends the training sample to a training node; the training node trains a classifier to obtain a target classifier; each computing node classifies the newly added vector data according to the similarity of vector features and establishes a feature classification index according to a classification result and performs vector data retrieval.

20 Claims, 8 Drawing Sheets

(56) References Cited

U.S. PATENT DOCUMENTS

2020/0182618 A1\* 6/2020 Xu .................. G01C 21/08
2020/0285900 A1\* 9/2020 He .................. G06N 3/047
2021/0034929 A1\* 2/2021 Zilberman ........... G06V 40/173

FOREIGN PATENT DOCUMENTS

| CN | 110070060 A | 7/2019 |
| CN | 110110792 A | 8/2019 |
| CN | 111160075 A | 2/2020 |
| CN | 111461180 A | 7/2020 |

\* cited by examiner

In a case where an amount of newly added vector data is received from one of multiple computing nodes, acquire the amount of the newly added vector data of all of the multiple computing nodes ~ S21

In a case where the average amount of the newly added vector data of all of the multiple computing nodes reaches a preset average amount, instruct each computing node to extract a training sample from the newly added vector data ~ S22

FIG. 8

Receive a training sample from each of multiple computing nodes, and train a classifier according to the training sample to obtain a target classifier, where the training samples include vector data ~ S31

FIG. 9

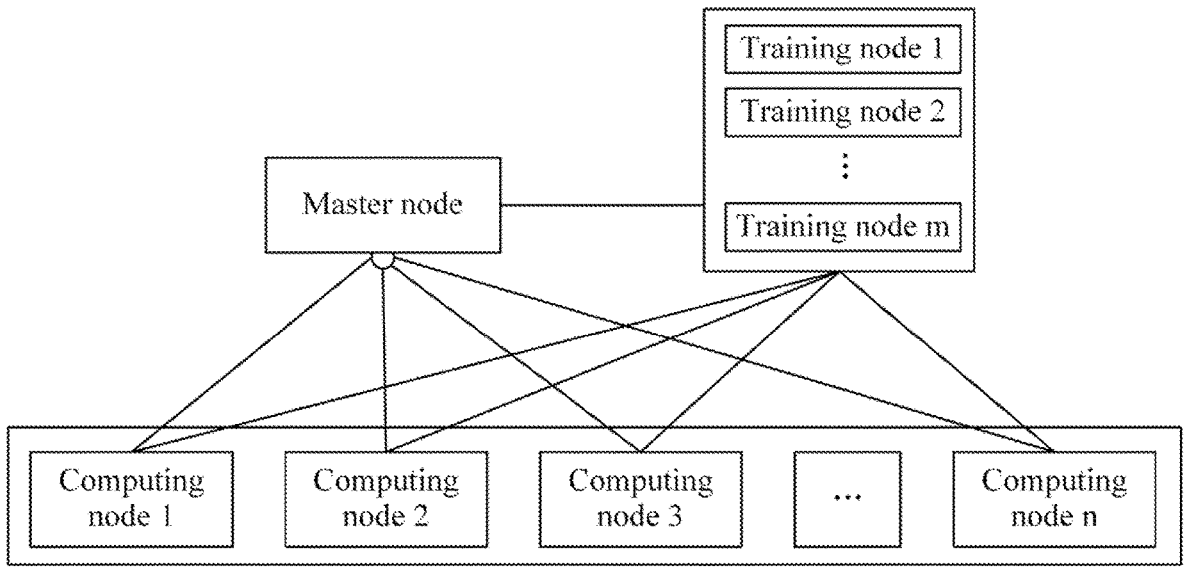

FIG. 10

VECTOR DATA PROCESSING METHOD AND SYSTEM, COMPUTING NODE, AND STORAGE MEDIUM

CROSS REFERENCE TO RELATED APPLICATIONS

This is a national stage application filed under 37 U.S.C. 371 based on International Patent Application No. PCT/CN2020/142391, filed on Dec. 31, 2020, which claims priority to Chinese Patent Application No. 202010826189.5 filed with the China National Intellectual Property Administration (CNIPA) on Aug. 17, 2020, the disclosure of which is incorporated herein by reference in its entirety.

TECHNICAL FIELD

Embodiments of the present application relate to the field of data processing technology, for example, a vector data processing method and system, a computing node, a master node, a training node, and a storage medium.

BACKGROUND

With the development and landing of artificial intelligence technology, more and more "indescribable" data are described and computed in the form of feature vector data, such as text, sound, and appearance. When these massive feature data are gathered together, how to find the same or similar data quickly and accurately becomes an urgent problem to be solved.

When the size of a data set is continuously expanded, if a classifier is not retrained, the accuracy of classifying the data set will decrease. If the classifier is retrained, the time for resampling and training of multiple computing nodes will become longer and longer. After the data set becomes larger, the time for sampling and data loading increases non-linearly, and the search time also increases as the overall data size increases.

SUMMARY

Embodiments of the present application provide a vector data processing method, apparatus, and device, and a storage medium to quickly train a classifier and establish an index when vector data increase.

An embodiment of the present application provides a vector data processing method. The method includes receiving, by each computing node of a plurality of computing nodes, newly added vector data and placing the newly added vector data in a cache of each computing node; in the case where one computing node detects that an amount of the newly added vector data in the cache of the one computing node meets a preset amount, sending, by the one computing node, the amount of the newly added vector data of the one computing node to a master node; receiving, by the master node, the amount of the newly added vector data of the one computing node from the one computing node, and acquiring the amount of newly added vector data of all of the plurality of computing nodes; and in the case where an average amount of the newly added vector data of all of the plurality of computing nodes reaches a preset average amount, instructing each computing node of extracting a training sample from the newly added vector data of each computing node; extracting, by each computing node, the training sample from the newly added vector data of each computing node and sending the training sample to a training node; training, by the training node, a classifier according to the training sample to obtain a target classifier corresponding to each computing node; based on the target classifier corresponding to each computing node, classifying, by each computing node, the newly added vector data of each computing node according to similarity of vector features of the newly added vector data of each computing node to obtain a classification result; and establishing, by each computing node, a feature classification index according to the classification result and perform vector data retrieval according to the feature classification index.

An embodiment of the present application also provides a vector data processing method. The method includes receiving newly added vector data and placing the newly added vector data in a cache; and in the case where an amount of the newly added vector data in the cache are detected to meet a preset amount, sending the amount of the newly added vector data to a master node; receiving an instruction from the master node, extracting a training sample from the newly added vector data, and sending the training sample to a training node so that the training node trains a classifier according to the training sample to obtain a target classifier; classifying, based on the target classifier, the newly added vector data according to similarity of vector features of the newly added vector data to obtain a classification result; and establishing a feature classification index according to the classification result and perform vector data retrieval according to the feature classification index.

An embodiment of the present application also provides a vector data processing method. The method includes, in the case of receiving an amount of newly added vector data from one computing node of a plurality of computing nodes, acquiring an amount of newly added vector data of all of the plurality of computing nodes; and in the case where an average amount of the newly added vector data of all of the plurality of computing nodes reaches a preset average amount, instructing each computing node of extracting a training sample from the newly added vector data.

An embodiment of the present application also provides a vector data processing method. The method includes receiving training samples from a plurality of computing nodes, and training a classifier according to the training samples to obtain a target classifier, where the training samples include vector data.

An embodiment of the present application provides a vector data processing system. The system includes a plurality of computing nodes, a master node, and a training node. Each of the plurality of computing nodes is connected to the master node and is communicatively connected to the training node. The master node is communicatively connected to the training node.

Each computing node of the plurality of computing nodes is configured to receive newly added vector data and place the newly added vector data in a cache of each computing node. In the case where one computing node detects that an amount of the newly added vector data in the cache of the one computing node meet a preset amount, the one computing node is configured to send the amount of the newly added vector data of the one computing node to the master node.

The master node is configured to receive the amount of the newly added vector data of the one computing node from the one computing node, acquire an amount of newly added vector data of all of the plurality of computing nodes, and in the case where an average amount of the newly added vector data of all of the plurality of computing nodes reaches a preset average amount, instruct each computing node of extracting a training sample from the newly added vector data of each computing node.

Each computing node is further configured to extract the training sample from the newly added vector data of each computing node and send the training sample to the training node.

The training node is configured to train a classifier according to the training sample to obtain a target classifier corresponding to each computing node.

Based on the target classifier corresponding to each computing node, each computing node is further configured to classify the newly added vector data of each computing node according to similarity of vector features of the newly added vector data of each computing node to obtain a classification result.

Each computing node is further configured to establish a feature classification index according to the classification result and perform vector data retrieval according to the feature classification index.

An embodiment of the present application provides a computing node. The computing node includes one or more processors and a memory.

The memory is configured to store one or more programs.

When executed by the one or more processors, the one or more programs cause the one or more processors to implement the vector data processing method in the embodiments of the present application.

An embodiment of the present application provides a master node. The master node includes one or more processors and a memory.

The memory is configured to store one or more programs.

When executed by the one or more processors, the one or more programs cause the one or more processors to implement the vector data processing method in the embodiments of the present application.

An embodiment of the present application provides a training node. The training node includes one or more processors and a memory.

The memory is configured to store one or more programs.

When executed by the one or more processors, the one or more programs cause the one or more processors to implement the vector data processing method in the embodiments of the present application.

An embodiment of the present application provides a computer-readable storage medium storing a computer program which, when executed by a processor, implements the vector data processing method in any embodiment of the present application.

BRIEF DESCRIPTION OF DRAWINGS

FIG. 8 is a flowchart of another vector data processing method according to an embodiment of the present application.

FIG. 9 is a flowchart of another vector data processing method according to an embodiment of the present application.

FIG. 10 is a diagram illustrating the structure of a vector data processing system according to an embodiment of the present application.

DETAILED DESCRIPTION

Figure 1:
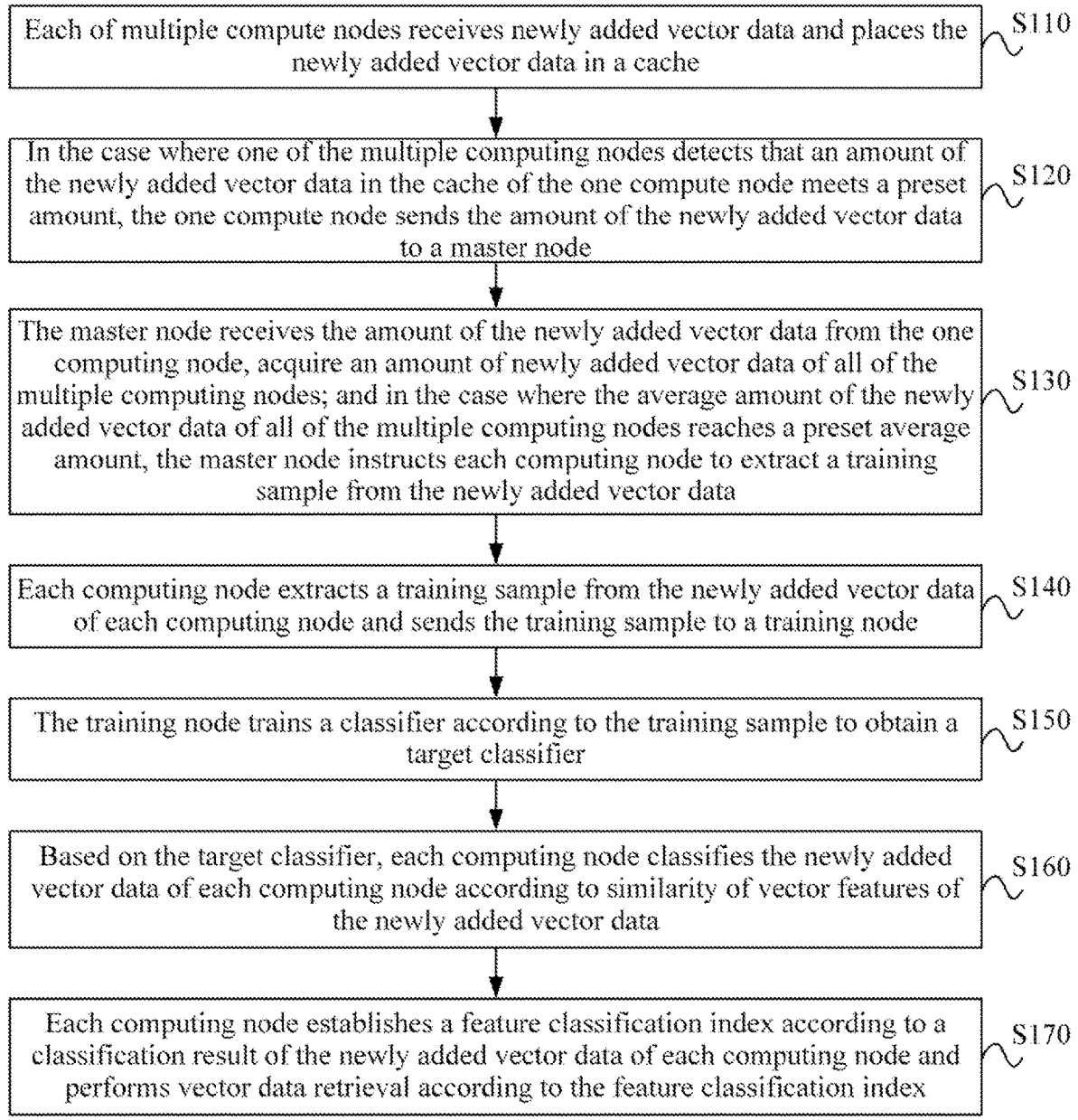
FIG. 1 is a flowchart of a vector data processing method according to an embodiment of the present application.

The present application is described below in conjunction with drawings and embodiments. It is to be understood that the embodiments set forth below are intended to illustrate but not to limit the present application. For ease of description, only part, not all, of structures related to the present application are illustrated in the drawings.

FIG. 1 is a flowchart of a vector data processing method according to an embodiment of the present application. The vector data processing method provided in this embodiment is applicable to the case where vector data are processed. The method may be applicable to the case of accessing, indexing, and retrieving the vector data. The method may be executed by a vector data processing system. Referring to FIG. 1, the method in this embodiment of the present application includes the following steps.

In S110, each of multiple computing nodes receives newly added vector data and places the newly added vector data in a cache.

The newly added vector data are vector data in the newly accessed computing node. The newly added vector data may be vector data generated in real time or may be history vector data existing in the system and database. The multiple computing nodes may be connected to a data access layer. The data access layer receives the newly added vector data and sends the newly added vector data to the multiple computing nodes according to the amount of the computing nodes on a load balancing principle. After receiving the newly added vectors, the computing nodes cache the new vectors. Since the amount of the newly added vector data at the beginning of access is small, the newly added vector data have not formed a certain scale and cannot meet the requirements of high-accuracy model training. Therefore, the accessed data is cached first, and then a certain amount of the newly added vector data are used for model training when the cached amount reaches a certain amount.

In S120, in the case where one of the multiple computing nodes detects that an amount of the newly added vector data in the cache of the one computing node meets a preset amount, the one computing node sends the amount of the newly added vector data to a master node.

In S130, the master node receives the amount of the newly added vector data from the one computing node, acquires an amount of newly added vector data of all of the multiple computing nodes; and in the case where the average amount of the newly added vector data of all of the multiple computing nodes reaches a preset average amount, the master node instructs each computing node to extract a training sample from the newly added vector data.

In S140, each computing node extracts a training sample from the newly added vector data of each computing node and sends the training sample to a training node.

In S150, the training node trains a classifier according to the training sample to obtain a target classifier.

The target classifier includes classifier parameters such as the amount of classifications and the representative vector of each class.

When one of the multiple computing nodes detects that an amount of the newly added vector data accessed by the one computing node reaches a preset amount, the one computing node sends the amount of the newly added vector data to the master node. After receiving the amount of the newly added vector data from the one computing node, the master node may actively acquire an amount of the newly added vector data of all of the multiple computing nodes. The master node computes the average amount of the currently newly added vector data of all computing nodes according to the amount of the newly added vector data from the multiple computing nodes. If the average amount reaches the preset average amount, the computing node extracts a training sample from the newly added vector data so that the training node trains the classifier to obtain the target classifier.

In an embodiment, after determining that the average amount of newly added vector data of the all computing nodes reaches a preset average amount, the master node triggers the training node to initialize training tasks.

In an embodiment, after completing extracting a training sample from newly added vector data, each computing node sends an extraction completion instruction to the master node. After receiving the extraction completion instruction from the all computing nodes, the master node instructs the training node to start the training of the classifier. After receiving an instruction, the training node trains the classifier according to the received training sample. After the training node completes the training of the classifier, the trained classifier parameters are stored in the persistent storage hardware, and a training completion instruction is sent to the master node.

In an embodiment, the amount of samples extracted by each computing node may be a ratio of the amount of samples required to train the classifier to the amount of computing nodes.

The amount of samples required to train the classifier may be set according to the actual situation. For example, the amount of samples may be the amount of training samples that can be trained to obtain an accurate model.

When the amount of the cached newly added vector data meets a certain amount, training samples are then extracted for the training of the classifier. Thus, there are enough training samples for the training of the classifier to meet the requirements of the amount of samples for the training of a high-accuracy classifier, thereby training to obtain a high-accuracy target classifier. In addition, the amount of newly added vectors received by a single computing node may be accidental and cannot reflect the overall level of the amount of newly added vectors. If it is determined whether to extract training samples for training only by the amount of newly added vectors received by a single computing node, there may be a problem that the amount of newly added vectors as a whole is not high enough to extract a sufficient amount of training samples. In this embodiment of the present application, the master node computes the average amount of the currently newly added vector data of all computing nodes according to the amount of the newly added vector data from all computing nodes. If the average amount reaches the preset average amount, the master node schedules each computing node to extract a training sample from the newly added vector data and sends the training sample to the training node. Thus, the training node trains the classifier to obtain the target classifier, thereby comprehensively considering the overall level of the amount of the newly added vectors, and ensuring that the overall amount of newly added vectors meets the requirements of the training of a high-precision classifier.

In S160, based on the target classifier, each computing node classifies the newly added vector data of each computing node according to similarity of vector features of the newly added vector data.

Based on the representative vector, the target classifier classifies the newly added vector data according to the vector features of the newly added vector data and classifies the newly added vector data whose features are most similar to the representative vector into one class to form a vector data cluster.

In an embodiment, the classification result includes a vector data cluster and the representative vector data of the vector data cluster. Each computing node establishes a feature classification index according to the classification result. This includes each computing node establishing a mapping relationship between the vector data cluster and representative vectors of the vector data cluster to form the feature classification index.

In S170, each computing node establishes a feature classification index according to the classification result of the newly added vector data of each computing node and performs vector data retrieval according to the feature classification index.

To facilitate retrieval of to-be-retrieved vector data in a vector retrieval request, a feature classification index is established for the newly added vector data. Exemplarily, each computing node establishes a feature classification index according to the vector data cluster obtained by classification, thereby determining a vector data cluster related to the to-be-retrieved vector data according to the feature classification index, and further obtaining a target vector by retrieving from the related vector data cluster.

In this embodiment of the present application, if the newly added vector data are real-time vector data, after each computing node receives the newly added vector data and places the newly added vector data in a cache, the method also includes the following steps. If the training of the target classifier is not completed, each computing node classifies the real-time vector data according to vector features by using a history classifier to obtain a temporary classification result. Each computing node establishes a temporary feature classification index according to the temporary classification result.

Figure 2:
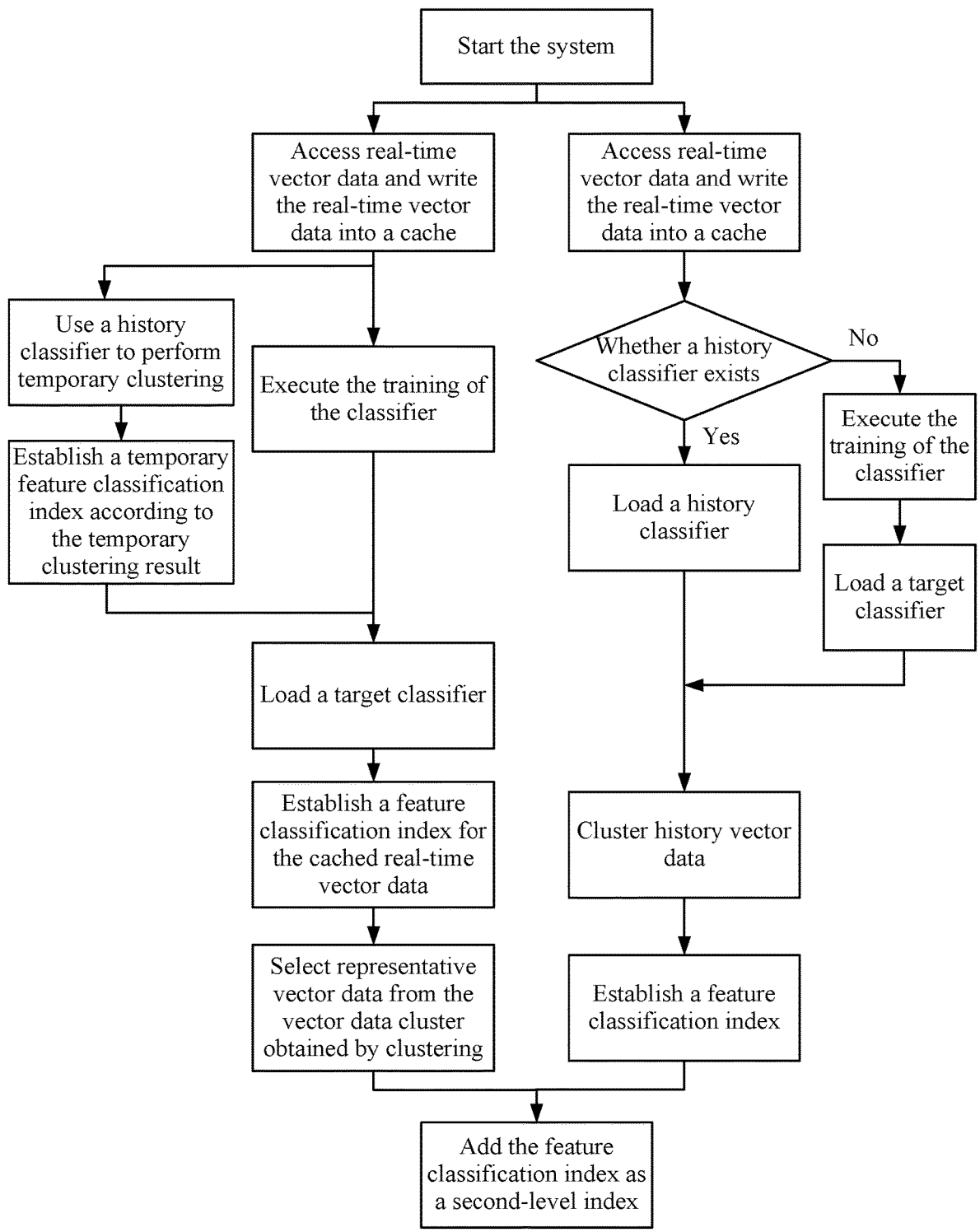
FIG. 2 is a flowchart showing the implementation of a vector data processing method according to an embodiment of the present application.

As shown in FIG. 2, when the real-time vector data start to access, if the amount of the real-time vector data does not reach the preset amount, the training of the classifier is not started or the training of the classifier is not completed, and the feature classification index is not established for the real-time vector data. If the vector retrieval request is received at this time, the to-be-retrieved vector data can be searched only by traversing the real-time vector data, affecting retrieval efficiency. In this embodiment of the present application, if the training of the target classifier is not completed and the feature classification index is not established, each computing node classifies the real-time vector data by using the history classifier to obtain a temporary classification result and establishes the temporary feature classification index according to the temporary classification result to meet the requirements of the current vector retrieval services. If the training of the target classifier is completed, each computing node classifies the real-time vector data by using the target classifier to obtain a classification result and establishes a feature classification index according to the classification result. At this time, the temporary feature classification index may be replaced by the feature classification index. The history classifier in the cache is deleted by the computing node. The current target classifier is used as a history classifier for the next batch of newly added vector data.

The temporary feature classification index can also be established for the newly added vector data before the training of the target classifier is completed, thereby meeting the current retrieval requirements. Due to the continuity of vector data, the history classifier can be applicable to the temporary classification of the newly added vector data.

In this embodiment of the present application, if the newly added vector data are history vector data, after each computing node receives the newly added vector data and places the newly added vector data in a cache, the method also includes the following steps. If a history classifier exists, each computing node classifies history vector data according to vector features by using a history classifier. Each computing node establishes a feature classification index according to the classification result and performs vector data retrieval according to the feature classification index. If a history classifier does not exist, each computing node triggers the execution of the case where one computing node detects that the amount of the newly added vector data in the cache of the one computing node meets the preset amount, the one computing node sends the amount of the newly added vector data to the master node.

As shown in FIG. 2, if the newly added vector data are history vector data, the training of the classifier may have been completed according to the history vector data before. The trained history classifier is applicable to classifying the history vector data. Therefore, if the newly added vector data received by the computing node are the history vector data, and a history classifier exists at present, the history vector data are classified by using the history classifier. The feature classification index for the history vector data is established according to the classification result. If a history classifier does not exist, each computing node triggers the execution of the case where each computing node detects that the amount of the newly added vector data in the cache of each computing node meets the preset amount, each computing node sends the amount of the newly added vector data to the master node. The master node is instructed to extract a training sample from the newly added vector data so that the computing node extracts a training sample from the newly added vector data and sends the training sample to the training node. The training node trains the target classifier. Then, the computing node classifies the history vector data by using the trained target classifier and establishes a feature classification index for the history vector data according to the classification result.

In the case where a history classifier exists, the history vector data are classified by using the history classifier, and a feature classification index is established, thereby improving the efficiency of index establishment. In the case where a history classifier does not exist, the history vector data are used to train the classifier to obtain the target classifier, and the history vector data are classified, thereby establishing the feature classification index to facilitate the vector data index.

In this embodiment of the present application, the newly added vector data received by the computing node is cached. Then, the samples are extracted for training when the average amount of the newly added vector data received by the multiple computing nodes reaches the preset average amount. In this manner, the requirements of the amount of model training are meet, and the accuracy of the model training is improved. When the average amount of newly added vector data in the caches of the multiple computing nodes meets the preset average amount, the computing nodes extract training samples from the newly added vector data. Thus, the training node trains the classifier according to the training samples to obtain the target classifier. The computing nodes classify the newly added vector data by using the target classifier. The computing nodes establish a feature classification index according to the classification result and perform vector data retrieval according to the feature classification index, thereby improving the efficiency of the vector data retrieval.

Figure 3:
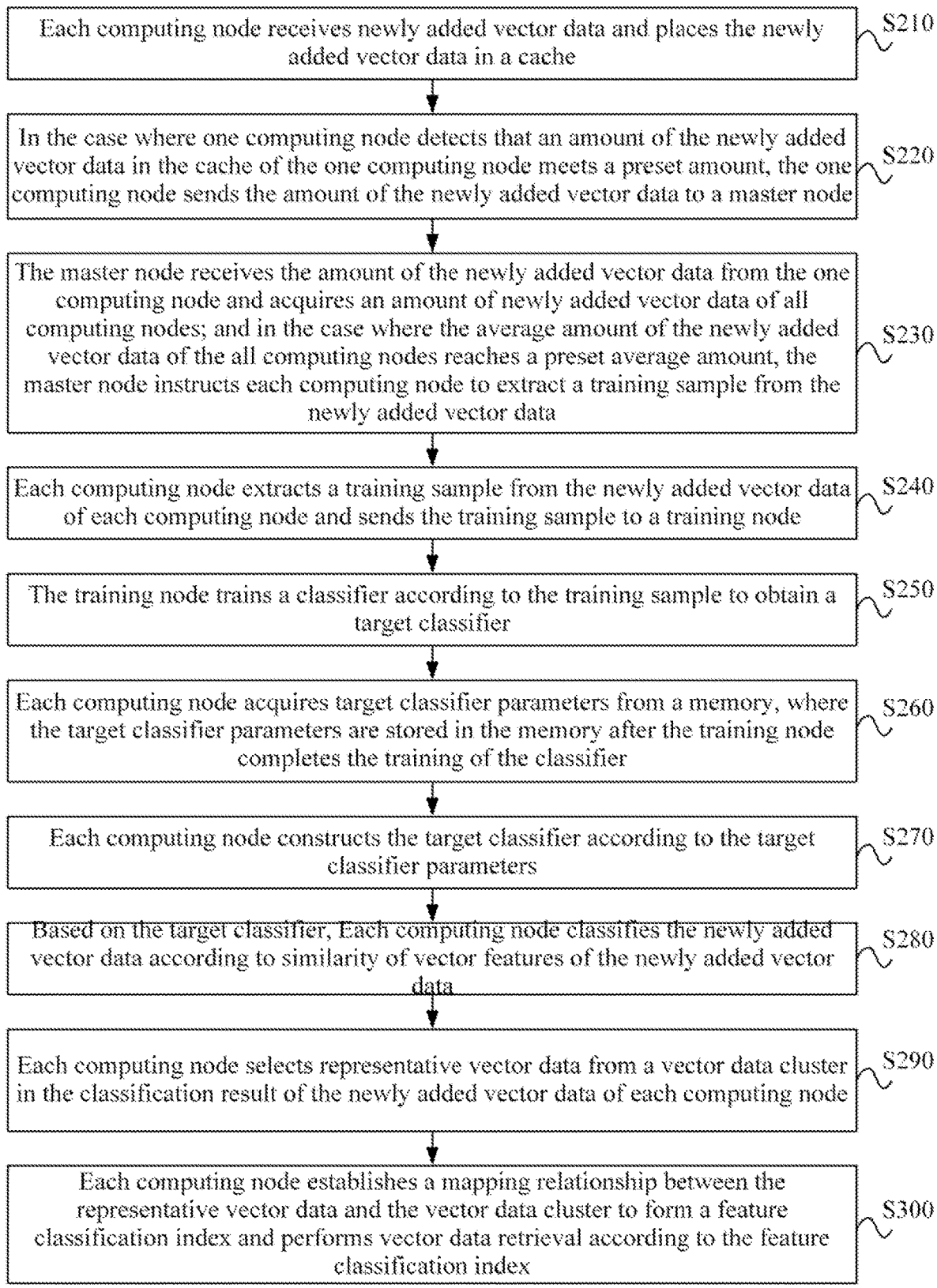
FIG. 3 is a flowchart of another vector data processing method according to an embodiment of the present application.

FIG. 3 is a flowchart of another vector data processing method according to an embodiment of the present application. This embodiment of the present application is described based on the preceding embodiment. For details not described in this embodiment, reference can be made to the preceding embodiment. Referring to FIG. 3, the vector data processing method provided in this embodiment may include the following steps.

In S210, each of multiple computing nodes receives newly added vector data and places the newly added vector data in a cache.

In S220, in the case where one computing node detects that an amount of the newly added vector data in the cache of the one computing node meets a preset amount, the one computing node sends the amount of the newly added vector data to a master node.

In S230, the master node receives the amount of the newly added vector data from the one computing node and acquires the amount of newly added vector data of all of the multiple computing nodes; and in the case where the average amount of the newly added vector data of all of the multiple computing nodes reaches a preset average amount, the master node instructs each computing node to extract a training sample from the newly added vector data.

In S240, each computing node extracts a training sample from the newly added vector data of each computing node and sends the training sample to a training node.

In S250, the training node trains a classifier according to the training sample to obtain a target classifier.

In this embodiment of the present application, the classification process of the newly added vector data and the retrieval process of the newly added vector data are executed by the computing nodes, and the training process of the classifier is executed by the training node.

Figure 4:
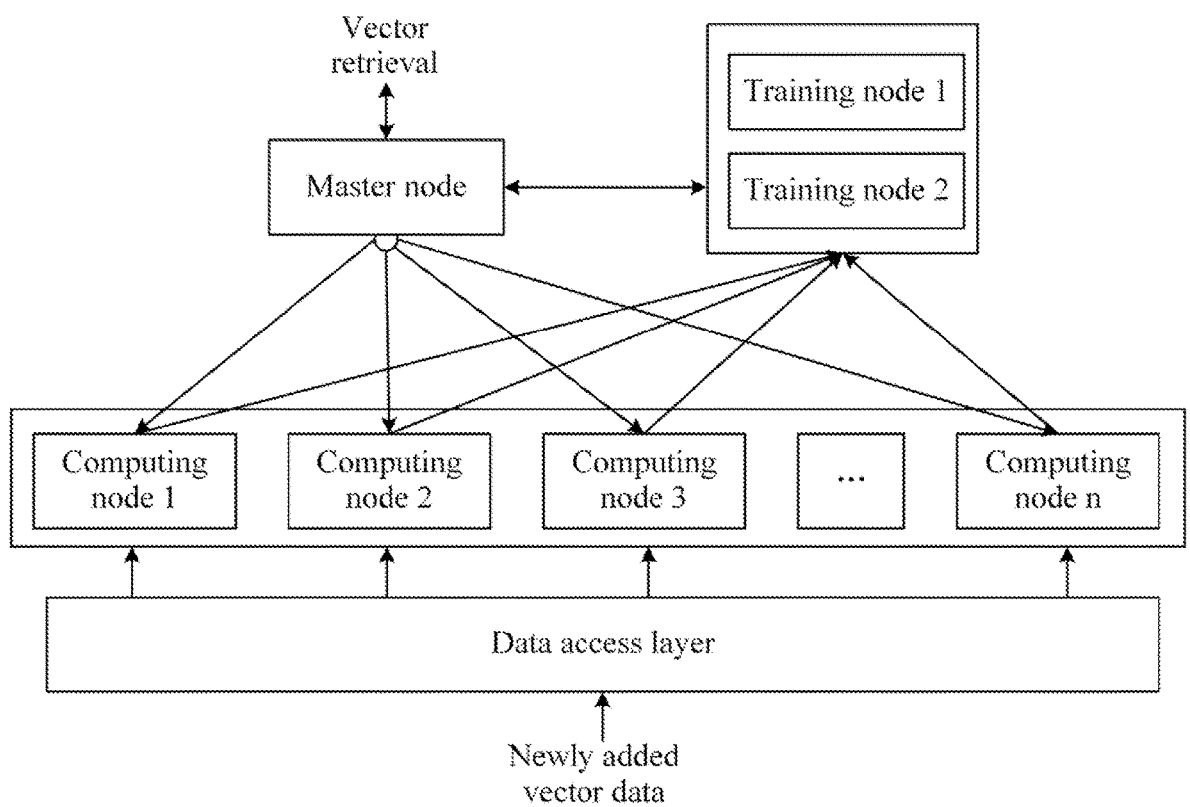
FIG. 4 is a diagram illustrating the structure of a vector data processing module according to an embodiment of the present application.

As shown in FIG. 4, a computing node extracts a training sample from newly added vector data and sends the training sample to a training node. Training nodes train a classifier by using training samples to obtain a target classifier. The master node is a primary node and is responsible for managing other nodes and providing data services for the outside.

Figure 5:
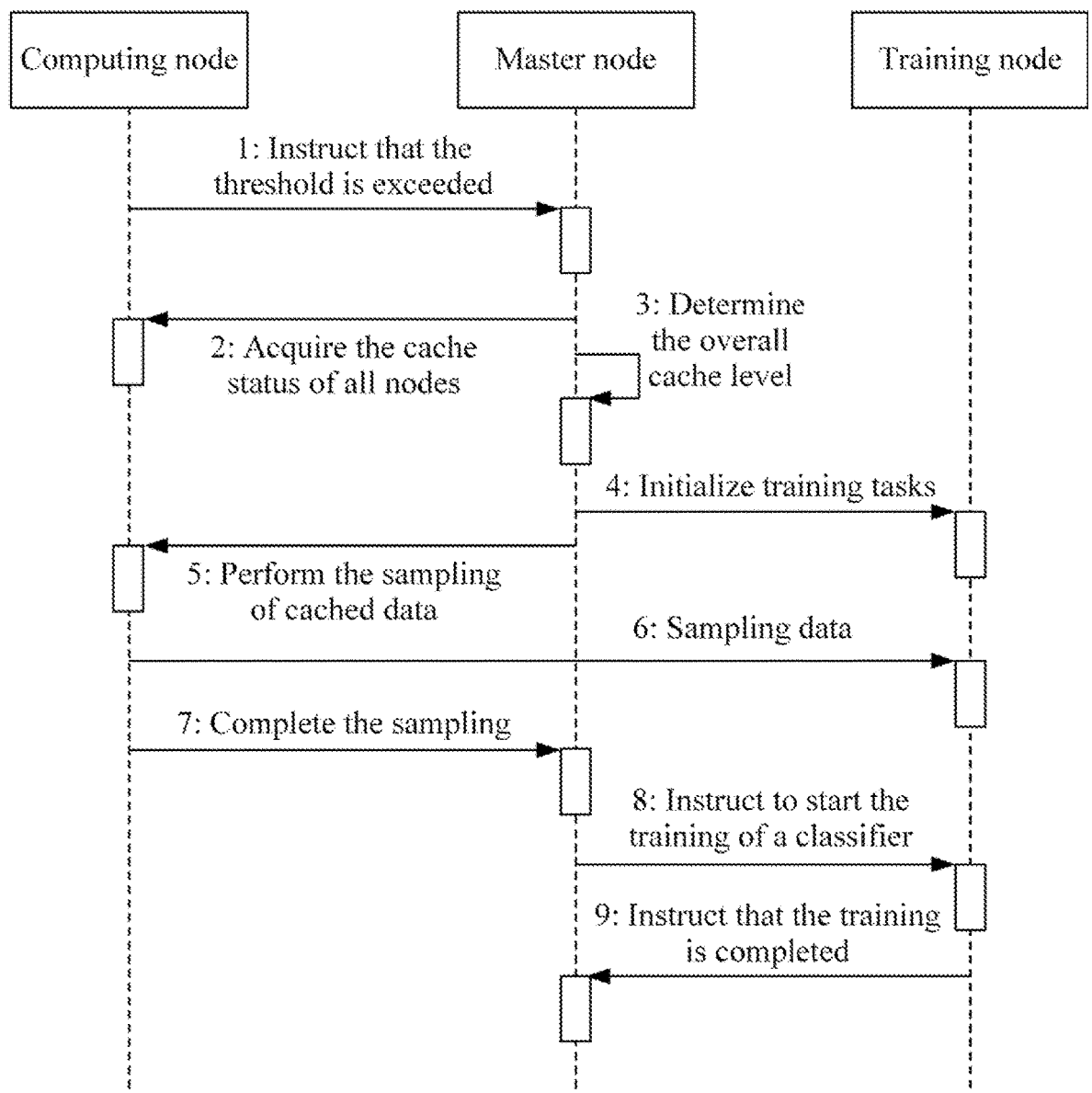
FIG. 5 is a diagram of vector data processing signaling according to an embodiment of the present application.

In this embodiment of the present application, as shown in FIG. 5, when one of the multiple computing nodes detects that an amount of the newly added vector data accessed by the one computing node reaches a preset amount, the one computing node sends the amount of the newly added vector data to the master node. The master node computes the average amount of the currently newly added vector data of all of the multiple computing nodes according to the amount of the newly added vector data from all of the multiple computing nodes. If the average amount reaches a preset average amount, each of the multiple computing nodes extracts training samples from the newly added vector data and sends the training samples to the training node. The training node trains a classifier to obtain a target classifier.

In this embodiment of the present application, the vector data access is deployed to the computing node for execution, and the training is deployed to the training node for execution. The vector data access process and the training process may be executed by two nodes at the same time without affecting each other. In addition, in the training process of the classifier, the computing node can process a vector retrieval request and provide retrieval services without being affected by the training of the classifier.

In S260, each computing node acquires target classifier parameters from a memory. The target classifier parameters are stored in the memory after the training node completes the training of the classifier.

After the training of the target classifier is completed, the training node persistently stores the target classifier into storage spaces. The stored target classifier parameters may include the following: a target classifier identifier, a classification identifier, a dimension of the vector data, a model of the vector data, an amount of classified categories, a search amount of approximate vector data clusters, whether the vector data are encrypted, a representative vector in multiple vector data clusters, and the like. Before establishing the feature classification index for the newly added vector data, the computing node obtains the target classifier parameters from the storage spaces and classifies the newly added vector data according to the target classifier parameters, thereby establishing the feature classification index.

In an embodiment, after the training of the target classifier is completed, the training node sends a training completion instruction to the master node. The master node instructs each computing node to start loading of the classifier.

In S270, each computing node constructs the target classifier according to the target classifier parameters.

After obtaining the target classifier parameters, the computing node constructs the target classifier according to the target classifier parameters to classify the newly added vector data according to the target classifier parameters, thereby establishing the feature classification index.

In S280, based on the target classifier, each computing node classifies the newly added vector data according to similarity of vector features of the newly added vector data.

In S290, each computing node selects representative vector data from a vector data cluster in the classification result of the newly added vector data of each computing node.

Exemplarily, newly added vector data with relatively obvious features may be selected from the vector data cluster as the representative vector data. Alternatively, after the newly added vector data are arranged according to the features, the newly added vector data arranged in the middle position may be selected as the representative vector data. This can be selected according to the actual condition and is not limited herein.

In S300, each computing node establishes a mapping relationship between the representative vector data and the vector data cluster to form a feature classification index and performs vector data retrieval according to the feature classification index.

Exemplarily, the representative vector selected from each vector data cluster establishes a mapping relationship with the vector data cluster to form a feature classification index. When the master node receives a vector retrieval request, the master node distributes the vector retrieval request to multiple computing nodes. The computing nodes lock a preset number of similar representative vector data according to the similarity between to-be-retrieved vectors and multiple representative vectors and determine a vector data cluster associated with the similar representative vector data according to the feature classification index. Then, the master node obtains a final retrieval result through traversing multiple associated vector data clusters. The final retrieval result is returned to the vector retrieval requester through the master node.

In this embodiment of the present application, the method also includes establishing the attribute classification index of the newly added vector data according to the attribute of the newly added vector data. The attribute includes the generation time of the newly added vector data and/or a geographic space in which a vector data object is generated. After establishing the feature classification index according to the classification result, the method also includes taking the attribute classification index as a first-level index, adding the feature classification index to the attribute classification index as a second-level index, and constructing a target classification index and performing vector data retrieval according to the target classification index.

In an embodiment, the method also includes each computing node receiving the attribute of the newly added vector data.

Figure 6:
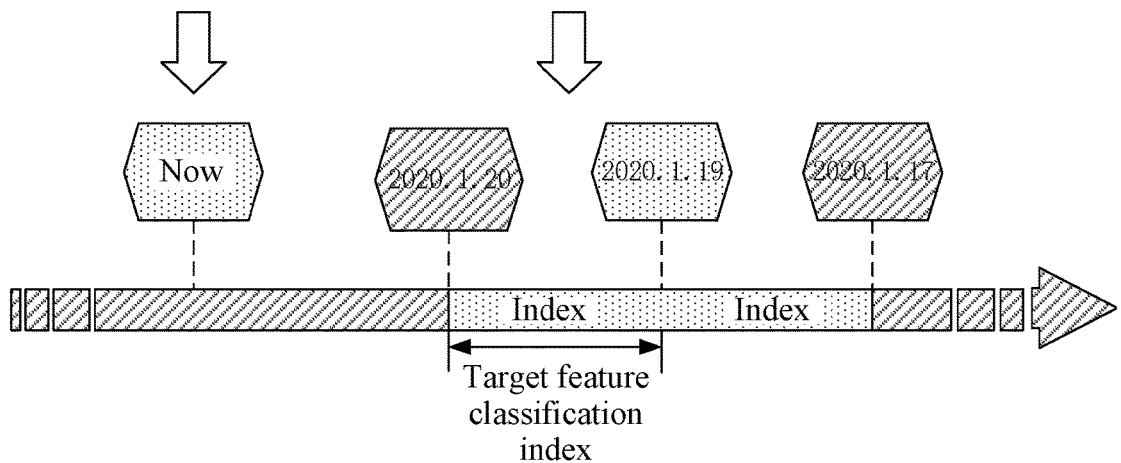
FIG. 6 is a diagram illustrating the structure of a second-level index according to an embodiment of the present application.

Exemplarily, as shown in FIG. 6, a first-level index is established according to the generation time of the newly added vector data. The feature classification index established for the newly added vector data in multiple time periods is added to the first-level index to form a second-level index. If a vector retrieval request is received, the time period in which to-be-retrieved vectors are located may be determined according to the attribute of the generation time of the to-be-retrieved vectors. The target feature classification index located in this time period and the vector data cluster located in this time period are determined. Then, the to-be-retrieved vectors are retrieved targetedly according to the target feature classification index. The second-level index is formed through spatio-temporal classification. This can improve the efficiency of vector retrieval and accelerate the process of vector retrieval.

In an embodiment, the vector retrieval request also includes the generation time of to-be-retrieved vector data.

In this embodiment of the present application, after the feature classification index is established according to the classification result, the method also includes each computing node storing the feature classification index and the newly added vector data in internal storage and clearing the cache.

According to the preceding solution, the available cache space can be cleared in time through the cache clearing so that the newly added vector data can be accessed, thereby ensuring that the newly added vector data can be accessed normally.

According to the technical solution in this embodiment of the present application, target classifier parameters stored persistently are acquired to construct the target classifier to classify the newly added vector data. Thus, access of the newly added vector data and training of the classifier are performed at the same time. The process of acquiring the target classifier does not affect access of the newly added vector data, thereby improving the vector processing efficiency. The mapping relationship between the representative vector data and the vector data cluster is established, thereby establishing the feature classification index. This is convenient to process the vector retrieval request quickly and efficiently subsequently according to the feature classification index.

Figure 7:
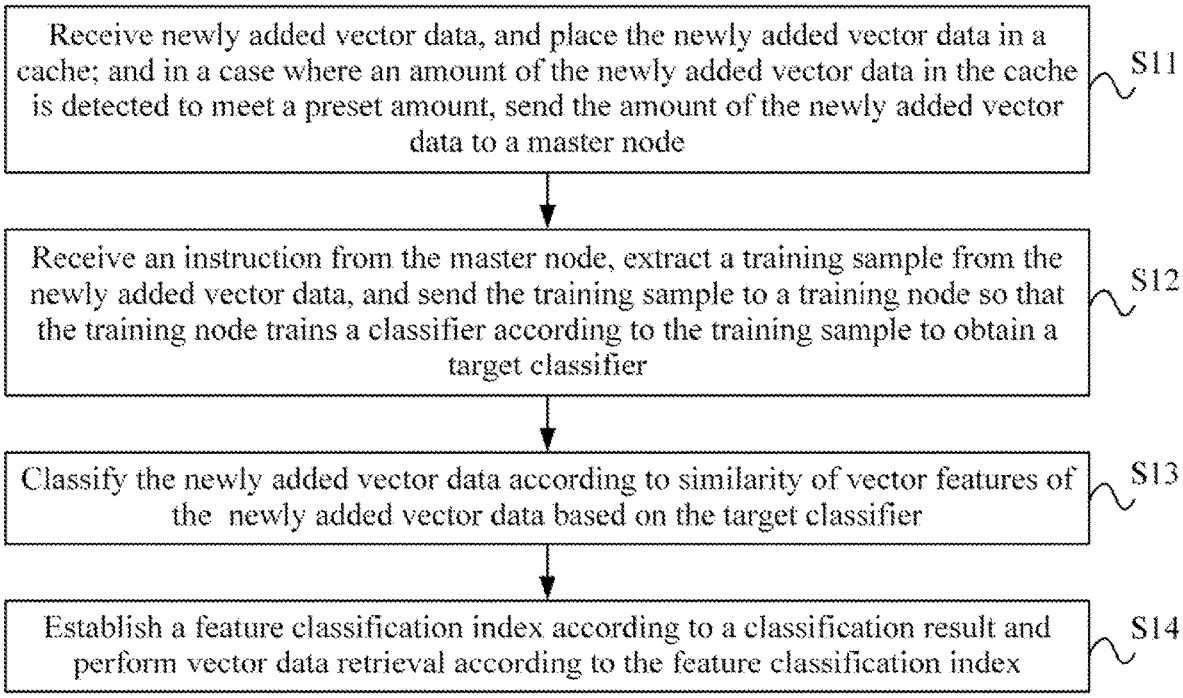
FIG. 7 is a flowchart of another vector data processing method according to an embodiment of the present application.

FIG. 7 is a flowchart of another vector data processing method according to an embodiment of the present application. Referring to FIG. 7, the method provided in this embodiment includes the following steps.

In S11, newly added vector data are received and then placed in a cache; and in a case where an amount of the newly added vector data in the cache is detected to meet a preset amount, the amount of the newly added vector data is sent to a master node.

In S12, an instruction is received from the master node. A training sample is extracted from the newly added vector data. The training sample is sent to a training node so that the training node trains a classifier according to the training sample to obtain a target classifier.

In S13, the newly added vector data are classified according to similarity of vector features of the newly added vector data based on the target classifier.

In S14, a feature classification index is established according to a classification result and vector data retrieval is performed according to the feature classification index.

FIG. 8 is a flowchart of another vector data processing method according to an embodiment of the present application. Referring to FIG. 8, the method provided in this embodiment includes the following steps.

In S21, in a case where an amount of newly added vector data is received from one of multiple computing nodes, the amount of the newly added vector data of all of the multiple computing nodes is acquired.

In S22, in a case where the average amount of the newly added vector data of all of the multiple computing nodes reaches a preset average amount, each computing node is instructed to extract a training sample from the newly added vector data.

FIG. 9 is a flowchart of another vector data processing method according to an embodiment of the present application. Referring to FIG. 9, the method provided in this embodiment includes the following steps.

In S31, a training sample is received from each of multiple computing nodes. A classifier is trained according to the training sample to obtain a target classifier. The training samples include vector data.

FIG. 10 is a diagram illustrating the structure of a vector data processing system according to an embodiment of the present application. The system is applicable to the case where vector data are processed. The system may be applicable to the case of accessing, indexing, and retrieving the vector data. Referring to FIG. 10, the system includes multiple computing nodes, a master node, and multiple training nodes. The multiple computing nodes are connected to the master node and are communicatively connected to the training nodes. The master node is communicatively connected to the training nodes. When one training node fails, another training node performs corresponding functions. The number of the multiple computing nodes is n and the number of the multiple training nodes is m, where n and m are each integers greater than 1 which may or may not be equal to each other.

In this embodiment of the present application, each computing node is also configured to, if training of the target classifier is not completed, classify real-time vector data of each computing node according to vector features by using a history classifier to obtain a temporary classification result; and establish a temporary feature classification index according to the temporary classification result of each computing node.

In this embodiment of the present application, each computing node is also configured to establish a feature classification index according to the classification result of history vector data of each computing node and perform vector data retrieval according to the feature classification index. Each computing node is also configured to, if a history classifier does not exist, trigger the execution of the case where one computing node detects that an amount of the newly added vector data in the cache of the one computing node meets the preset amount, the one computing node sends the amount of the newly added vector data to the master node.

In this embodiment of the present application, each computing node is also configured to acquire target classifier parameters from a memory. The target classifier parameters are stored in the memory after the training node completes the training of the classifier. Each computing node is also configured to construct a target classifier according to the target classifier parameters.

In this embodiment of the present application, each computing node is also configured to select representative vector data from a vector data cluster in the classification result of the newly added vector data of each computing node. Each computing node is also configured to establish a mapping relationship between the representative vector data and the vector data cluster to form a feature classification index.

In this embodiment of the present application, the classification result includes a vector data cluster and representative vectors of the vector data cluster. Each computing node is also configured to establish a mapping relationship between the representative vector data and the vector data cluster to form a feature classification index.

In this embodiment of the present application, each computing node is also configured to establish the attribute classification index of the newly added vector data according to the attribute of the newly added vector data. The attribute includes the generation time of the newly added vector data and/or a geographic space in which a vector data object is generated. Each computing node is also configured to, after each computing node establishes the feature classification index according to the classification result of the newly added vector data of each computing node, take the attribute classification index established by each computing node as a first-level index, add the feature classification index established by each computing node to the attribute classification index established by each computing node as a second-level index, construct a target classification index, and perform vector data retrieval according to the target classification index.

In this embodiment of the present application, each computing node is also configured to store the feature classification index established by each computing node and the newly added vector data of each computing node in internal storage and clear the cache.

In this embodiment of the present application, the master node is also configured to receive a vector retrieval request and send the vector retrieval request to each computing node. The vector retrieval request includes to-be-retrieved vector data. Each computing node is also configured to receive a vector retrieval request; retrieve multiple representative vector data according to the vector retrieval request; determine, according to the feature classification index, a preset amount of similar representative vector data meeting the vector retrieval request; and send the similar representative vector data to the master node. The master node is also configured to determine a final retrieval result according to the received vector data cluster.

The vector data processing system provided in the embodiment of the present application may perform the vector data processing method provided in any embodiment of the present application and has functions corresponding to the executed method.

Figure 11:
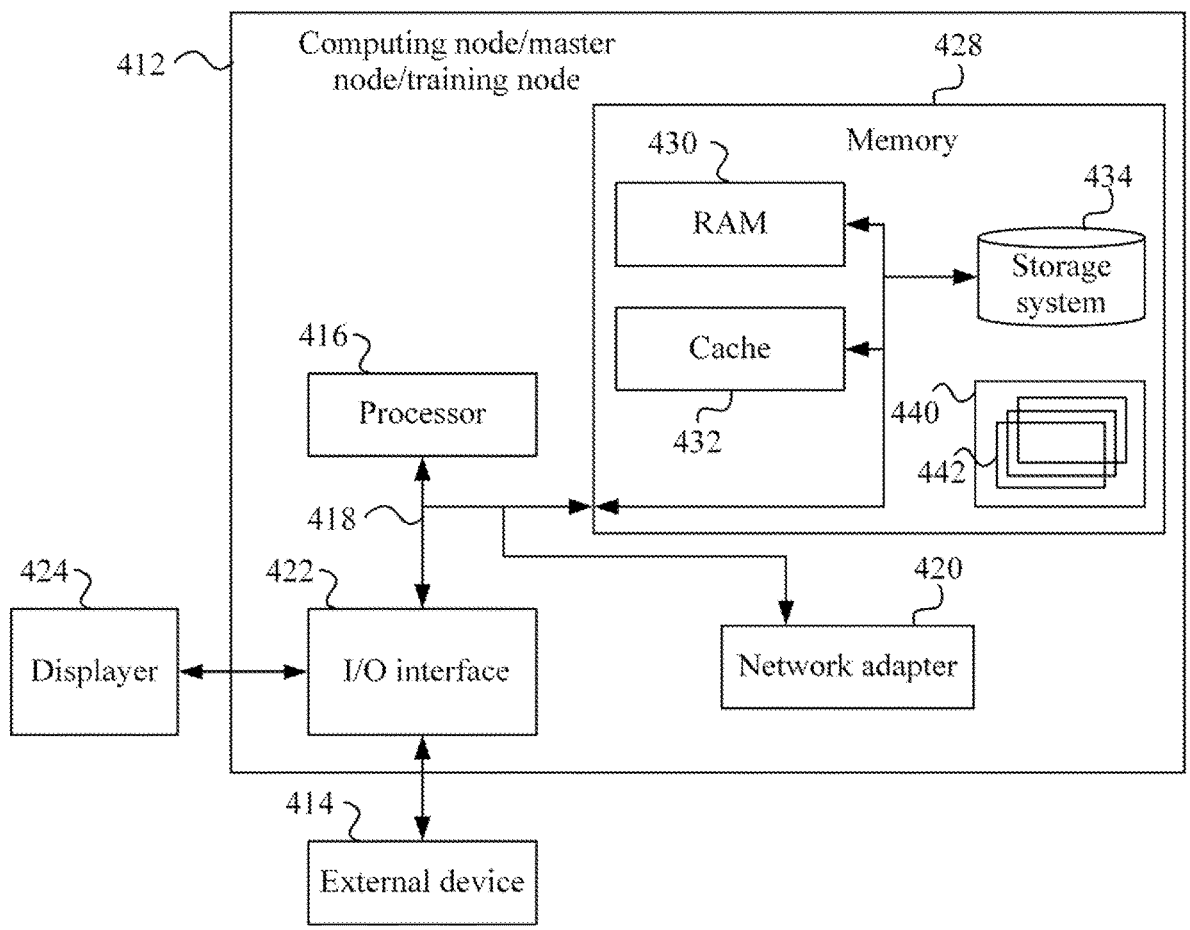
FIG. 11 is a diagram illustrating the structure of a computing node/master node/training node according to an embodiment of the present application.

FIG. 11 is a diagram illustrating the structure of a computing node/master node/training node according to an embodiment of the present application. FIG. 11 shows an example block diagram of a computing node/master node/training node 412 suitable for implementing embodiments of the present application. The computing node/master node/training node 412 shown in FIG. 11 is merely an example and is not intended to limit the function and use scope of embodiments of the present application.

As shown in FIG. 11, the computing node/master node/training node 412 may include one or more processors 416 and a memory 428 configured to store one or more programs. When executed by the one or more processors 416, the one or more programs cause the one or more processors 416 to implement the vector data processing method provided in the embodiments of the present application. The method includes receiving newly added vector data, and placing the newly added vector data in a cache; in the case where an amount of the newly added vector data in the cache is detected to meet a preset amount, sending the amount of the newly added vector data to a master node; receiving an instruction from the master node; extracting a training sample from the newly added vector data of each computing node; sending the training sample to a training node so that the training node trains a classifier according to the training sample to obtain a target classifier, where the target classifier includes classifier parameters such as the amount of classifications and the representative vector of each class; based on the target classifier, classifying the newly added vector data according to similarity of vector features of the newly added vector data; establishing a feature classification index according to a classification result; and performing vector data retrieval according to the feature classification index. Alternatively, the method includes, in the case where the amount of newly added vector data is received from one of multiple computing nodes, acquiring the amount of the newly added vector data of all of the multiple computing nodes; and in the case where the average amount of the newly added vector data of all of the multiple computing nodes reaches a preset average amount, instructing each computing node to extract a training sample from the newly added vector data. Alternatively, the method includes receiving training samples from multiple computing nodes; and training a classifier according to the training samples to obtain a target classifier, where the training samples include vector data.

The components of the computing node/master node/training node 412 may include, but are not limited to, one or more processors or a processor 416, a memory 428, and a bus 418 connecting different device components (including the memory 428 and the processor 416).

The bus 418 represents one or more of several types of bus structures, including a memory bus or memory controller, a peripheral bus, an accelerated graphics port, and a processor, or represents a local bus using any one of multiple bus structures. For example, these architectures include, and are not limited to, an industry standard architecture (ISA) bus, a micro channel architecture (MAC) bus, an enhanced ISA bus, a video electronics standards association (VESA) local bus, and a peripheral component interconnect (PCI) bus.

The computing node/master node/training node 412 includes a variety of computer device readable storage media. These storage media may be available storage media that can be accessed by a vector data processing device 412, including volatile and non-volatile storage media, removable and non-removable storage media.

The memory 428 may include a computer device readable storage medium in the form of a volatile memory, such as a random-access memory (RAM) 430 and/or a cache 432. The vector data processing device 412 may also include other removable/non-removable and volatile/non-volatile computer device storage media. By way of example only, a storage system 434 may be configured to read from and write to non-removable and non-volatile magnetic storage media (not shown in FIG. 11, commonly referred to as a "hard disk drive"). Although not shown in FIG. 11, the storage system 434 can provide not only a magnetic disk driver for performing reading and writing on a removable non-volatile magnetic disk (for example, a "floppy disk"), but also an optical disk driver for performing reading and writing on a removable non-volatile optical disk (for example, a compact disc read-only memory (CD-ROM), a digital video disc-read only memory (DVD-ROM), or other optical storage media). In these cases, each driver may be connected to the bus 418 by one or more data storage media interfaces. The memory 428 may include at least one program product having a group of program modules (for example, at least one program module). Such program modules are configured to perform functions of multiple embodiments of the present application.

A program/utility 440 having a group of program modules 442 (at least one program module 442) may be stored in, for example, the memory 428. Such program modules 442 include, but are not limited to, an operating device, one or more application programs, other program modules and program data. Each or some combination of these examples may include implementation of a network environment. The program modules 442 generally perform functions and/or methods in the embodiments of the present application.

The computing node/master node/training node 412 may communicate with one or more external devices 414 (such as a keyboard, a pointing device and a displayer 426). The computing node/master node/training node 412 may also communicate with one or more devices that enable a user to interact with the vector data processing device 412, and/or with any device (such as a network card or a modem) that enables the computing node/master node/training node 412 to communicate with one or more other computing devices. Such communication may be performed through an input/output (I/O) interface 422. Moreover, the computing node/master node/training node 412 may communicate with one or more networks (such as a local area networks (LAN), a wide area networks (WAN) and/or a public network, for example, the Internet) through a network adapter 420. As shown in FIG. 8, the network adapter 420 communicates with other modules of the computing node/master node/training node 412 via the bus 418. It is to be understood that although not shown in the FIG. 11, other hardware and/or software modules may be used in conjunction with the vector data processing device 412. The other hardware and/or software modules include, but are not limited to, microcode, a device driver, a redundant processor, an external disk drive array, a redundant arrays of independent disks (RAID) device, a tape driver, and a data backup storage device.

The processor 416 executes various functional applications and data processing through running at least one of the other programs stored in the memory 428, for example, to implement a vector data processing method provided in the embodiments of the present application.

According to an embodiment of the present application, a storage medium containing a computer-executable instruction is provided. When executed by a computer processor, the computer-executable instruction is configured to execute a vector data processing method. The method includes receiving newly added vector data, and placing the newly added vector data in a cache; in the case where an amount of the newly added vector data in the cache is detected to meet a preset amount, sending the amount of the newly added vector data to a master node; receiving an instruction from the master node; extracting a training sample from the newly added vector data of each computing node; sending the training sample to a training node so that the training node trains a classifier according to the training sample to obtain a target classifier, where the target classifier includes classifier parameters such as the amount of classifications and the representative vector of each class; based on the target classifier, classifying the newly added vector data according to similarity of vector features of the newly added vector data; establishing a feature classification index according to a classification result; and performing vector data retrieval according to the feature classification index. Alternatively, the method includes, in the case where the amount of newly added vector data is received from one of multiple computing nodes, acquiring an amount of the newly added vector data of all of the multiple computing nodes; and in the case where the average amount of the newly added vector data of all of the multiple computing nodes reaches a preset average amount, instructing each computing node to extract a training sample from the newly added vector data. Alternatively, the method includes receiving training samples from multiple computing nodes; and training a classifier according to the training samples to obtain a target classifier, where the training samples include vector data.

A computer storage medium in this embodiment of the present application may adopt any combination of one or more computer-readable storage media. The computer-readable storage media may be computer-readable signal storage media or computer-readable storage media. The computer-readable storage medium may be, but is not limited to, an electrical, magnetic, optical, electromagnetic, infrared, or semiconductor equipment, apparatus, or device, or any combination thereof. Examples (a non-exhaustive list) of the computer-readable storage medium include an electrical connection having one or more wires, a portable computer magnetic disk, a hard disk, an RAM, a read-only memory (ROM), an erasable programmable read-only memory (EPROM) or a flash memory, an optical fiber, a portable CD-ROM, an optical storage device, a magnetic storage device, or any suitable combination thereof. In this embodiment of the present application, the computer-readable storage medium may be any tangible storage medium containing or storing a program. The program may be used by or used in conjunction with an instruction execution equipment, apparatus, or device.

A computer-readable signal storage medium may include a data signal propagated in a baseband or as part of a carrier. Computer-readable program codes are carried in the data signal. The data signal propagated in this manner may be in multiple forms and includes, but is not limited to, an electromagnetic signal, an optical signal, or any suitable combination thereof. The computer-readable signal storage medium may also be any computer-readable storage medium except the computer-readable storage medium. The computer-readable storage medium may send, propagate, or transmit a program used by or used in conjunction with an instruction execution equipment, apparatus or device.

The program codes contained on the computer-readable storage medium may be transmitted on any suitable medium including, and not limited to, a wireless medium, a wired medium, an optical cable, and radio frequency (RF), or any suitable combination thereof.

Computer program codes for performing the operations of the present application may be written in one or more programming languages or a combination thereof, the programming languages including object-oriented programming languages such as Java, Smalltalk, and C++ and further including conventional procedural programming languages such as C programming language or similar programming languages. The program codes may be executed entirely or partially on a user computer, as a separate software package, partially on the user computer and partially on a remote computer, or entirely on the remote computer or device. In the case involving the remote computer, the remote computer may be connected to the user computer through any type of network including a LAN or a WAN, or may be connected to an external computer (for example, via the Internet through an Internet service provider).

What is claimed is:

1. A vector data processing method, comprising:
   receiving, by each computing node of a plurality of computing nodes, newly added vector data and placing the newly added vector data in a cache of each computing node;
   in a case where one computing node of the plurality of computing nodes detects that an amount of the newly added vector data in the cache of the one computing node meets a preset amount, sending, by the one computing node, the amount of the newly added vector data of the one computing node to a master node;
   receiving, by the master node, the amount of the newly added vector data of the one computing node from the one computing node and acquiring an amount of newly added vector data of all of the plurality of computing nodes; and in a case where an average amount of the newly added vector data of all of the plurality of computing nodes reaches a preset average amount, instructing, by the master node, each computing nodes to extract a training sample from the newly added vector data of each computing node;
   extracting, by each computing node, the training sample from the newly added vector data of each computing node and sending the training sample to a training node;
   training, by the training node, a classifier according to the training sample to obtain a target classifier corresponding to each computing node;
   based on the target classifier corresponding to each computing node, classifying, by each computing node, the newly added vector data of each computing node according to similarity of vector features of the newly added vector data of each computing node to obtain a classification result; and
   establishing, by each computing node and according to the classification result, a feature classification index and perform, according to the feature classification index, vector data retrieval.

2. The method of claim 1, in a case where the newly added vector data are real-time vector data, after receiving, by each computing node, the newly added vector data and placing the newly added vector data in the cache of each computing node, further comprising:
in a case where the training of the classifier is not completed, classifying, by each computing node, the real-time vector data of each computing node according to the vector features by using a history classifier to obtain a temporary classification result of each computing node; and
establishing, by each computing node, a temporary feature classification index according to the temporary classification result of each computing node.

3. The method of claim 1, in a case where the newly added vector data are history vector data, after receiving, by each computing node, the newly added vector data and placing the newly added vector data in the cache of each computing node, further comprising:
determining, by each computing node, whether a history classifier exists;
in a case where the history classifier exists, classifying, by each computing node, the history vector data of each computing node according to the vector features by using the history classifier to obtain a classification result of the history vector data of each computing node; and
establishing, by each computing node and according to the classification result, a feature classification index and performing, according to the feature classification index, vector data retrieval; and
in a case where the history classifier does not exist, triggering, by each computing node, the one computing node to send the amount of the newly added vector data of the one computing node to the mater node in a case where the one computing node detects that the amount of the newly added vector data in the cache of the one computing node meets the preset amount.

4. The method of claim 1, before based on the target classifier corresponding to each computing node, classifying, by each computing node, the newly added vector data of each computing node according to the similarity of the vector features, further comprising:
acquiring, by each computing node, target classifier parameters from a memory, wherein the target classifier parameters are stored in the memory after the training node completes the training of the classifier; and
constructing, by each computing node, the target classifier according to the target classifier parameters.

5. The method of claim 1, wherein establishing, by each computing node, the feature classification index according to the classification result comprises:
selecting, by each computing node, representative vector data from a vector data cluster in the classification result; and
establishing, by each computing node, a mapping relationship between the representative vector data and the vector data cluster to form the feature classification index.

6. The method of claim 1, wherein
the classification result comprises a vector data cluster and representative vector data of the vector data cluster; and
establishing, by each computing node, the feature classification index according to the classification result comprises: establishing, by each computing node, a mapping relationship between the vector data cluster and representative vectors of the vector data cluster to form the feature classification index.

7. The method of claim 1, further comprising:
establishing, by each computing node, an attribute classification index of the newly added vector data of each computing node according to an attribute of the newly added vector data of each computing node, wherein the attribute comprises at least one of generation time of the newly added vector data or a geographic space in which a vector data object is generated; and
after establishing, by each computing node, the feature classification index according to the classification result, the method further comprising: taking, by each computing node, the attribute classification index established by each computing node as a first-level index, adding the feature classification index established by each computing node to the attribute classification index established by each computing node as a second-level index, and constructing a target classification index and performing vector data retrieval according to the target classification index.

8. The method of claim 1, after establishing, by each computing node, the feature classification index according to the classification result, further comprising:
storing, by each computing node, the feature classification index established by each computing node and the newly added vector data of each computing node in internal storage of each computing node, and clearing the cache of each computing node.

9. The method of claim 1, further comprising:
receiving, by the master node, a vector retrieval request, and sending the vector retrieval request to each computing node, wherein the vector retrieval request comprises to-be-retrieved vector data;
receiving, by each computing node, the vector retrieval request, retrieving a plurality of representative vector data according to the vector retrieval request, determining, according to the feature classification index, a preset amount of similar representative vector data meeting the vector retrieval request and a vector data cluster, and sending the similar representative vector data and the vector data cluster to the master node; and
determining, by the master node, a final retrieval result according to a vector data cluster.

10. A vector data processing method, comprising:
receiving newly added vector data and placing the newly added vector data in a cache; and in a case where an amount of the newly added vector data in the cache are detected to meet a preset amount, sending the amount of the newly added vector data to a master node;
receiving an instruction from the master node, extracting a training sample from the newly added vector data, and sending the training sample to a training node so that the training node trains a classifier according to the training sample to obtain a target classifier;
based on the target classifier, classifying the newly added vector data according to similarity of vector features of the newly added vector data to obtain a classification result; and
establishing, according to the classification result, a feature classification index and perform, according to the feature classification index, vector data retrieval.

11. A computing node, comprising:
at least one processor; and
a memory configured to store at least one program,
wherein when executed by the at least one processor, the at least one program causes the at least one processor to implement the vector data processing method of claim 10.

12. A non-transitory computer-readable storage medium storing a computer program which, when executed by a processor, implements the vector data processing method of claim 10.

13. A vector data processing system, comprising a plurality of computing nodes, a master node, and a training node, wherein each computing node of the plurality of computing nodes is connected to the master node and is communicatively connected to the training node, and the master node is communicatively connected to the training node;
  each computing node is configured to receive newly added vector data and place the newly added vector data in a cache of each computing node; and in a case where one computing node of the plurality of computing nodes detects that an amount of the newly added vector data in the cache of the one computing node meets a preset amount, the one computing node is configured to send the amount of the newly added vector data of the one computing node to the master node;
  the master node is configured to receive the amount of the newly added vector data of the one computing node from the one computing node, acquire an amount of newly added vector data of all of the plurality of computing nodes, and in a case where an average amount of the newly added vector data of all of the plurality of computing nodes reaches a preset average amount, instruct each computing node to extract a training sample from the newly added vector data of each computing node;
  each computing node is further configured to extract the training sample from the newly added vector data of each computing node and send the training sample to the training node;
  the training node is configured to train a classifier according to the training sample to obtain a target classifier corresponding to each computing node;
  based on the target classifier corresponding to each computing node, each computing node is further configured to classify the newly added vector data of each computing node according to similarity of vector features of the newly added vector data of each computing node to obtain a classification result; and
  each computing node is further configured to establish a feature classification index according to the classification result and perform vector data retrieval according to the feature classification index.

14. The system of claim 13, in a case where the newly added vector data are real-time vector data, after receiving the newly added vector data and placing the newly added vector data in the cache of each computing node, each computing node is further configured to:
  in a case where the training of the classifier is not completed, classify the real-time vector data of each computing node according to the vector features by using a history classifier to obtain a temporary classification result of each computing node; and
  establish a temporary feature classification index according to the temporary classification result of each computing node.

15. The system of claim 13, in a case where the newly added vector data are history vector data, after receiving the newly added vector data and placing the newly added vector data in the cache of each computing node, each computing node is further configured to:
  determine whether a history classifier exists;
  in a case where the history classifier exists, classify the history vector data of each computing node according to the vector features by using the history classifier to obtain a classification result of the history vector data of each computing node; and establish, according to the classification result, a feature classification index and perform, according to the feature classification index, vector data retrieval; and
  in a case where the history classifier does not exist, trigger the one computing node to send the amount of the newly added vector data of the one computing node to the mater node in a case where the one computing node detects that the amount of the newly added vector data in the cache of the one computing node meets the preset amount.

16. The system of claim 13, before classifying, based on the target classifier corresponding to each computing node, the newly added vector data of each computing node according to the similarity of the vector features, each computing node is further configured to:
  acquire target classifier parameters from a memory, wherein the target classifier parameters are stored in the memory after the training node completes the training of the classifier; and
  construct the target classifier according to the target classifier parameters.

17. The system of claim 13, wherein each computing node establishes the feature classification index according to the classification result by:
  selecting representative vector data from a vector data cluster in the classification result; and
  establishing a mapping relationship between the representative vector data and the vector data cluster to form the feature classification index.

18. The system of claim 13, wherein
  the classification result comprises a vector data cluster and representative vector data of the vector data cluster; and
  each computing node establishes the feature classification index according to the classification result by: establishing a mapping relationship between the vector data cluster and representative vectors of the vector data cluster to form the feature classification index.

19. The system of claim 13, wherein,
  each computing node is further configured to establish an attribute classification index of the newly added vector data of each computing node according to an attribute of the newly added vector data of each computing node, wherein the attribute comprises at least one of generation time of the newly added vector data or a geographic space in which a vector data object is generated; and
  after establishing the feature classification index according to the classification result, each computing node is further configured to: take the attribute classification index established by each computing node as a first-level index, add the feature classification index established by each computing node to the attribute classification index established by each computing node as a second-level index, and construct a target classification index and perform vector data retrieval according to the target classification index.

20. The system of claim 13, after establishing the feature classification index according to the classification result, each computing node is further configured to:
store the feature classification index established by each computing node and the newly added vector data of each computing node in internal storage of each computing node, and clear the cache of each computing node.

* * * * *